(12) United States Patent
Akama et al.

(10) Patent No.: US 7,268,972 B2
(45) Date of Patent: Sep. 11, 2007

(54) RECORDING MEDIUM DRIVE HAVING RECTIFIER PLATE INTEGRAL TO RAMP MEMBER

(75) Inventors: Kazunori Akama, Kawasaki (JP); Yoshihiro Arikawa, Kawasaki (JP); Hirofumi Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 471 days.

(21) Appl. No.: 10/716,883

(22) Filed: Nov. 20, 2003

(65) Prior Publication Data

US 2004/0120071 A1 Jun. 24, 2004

(30) Foreign Application Priority Data

Nov. 20, 2002 (JP) .............................. 2002-336569

(51) Int. Cl.
*G11B 33/14* (2006.01)
(52) U.S. Cl. .................................. 360/97.02; 360/97.03
(58) Field of Classification Search .. 360/254.2–255.9, 360/97.02, 97.03
See application file for complete search history.

(56) References Cited

U.S. PATENT DOCUMENTS 5,526,206 A * 6/1996 Shimizu .................. 360/254.8
5,995,330 A * 11/1999 Furay et al. .............. 360/254.7
6,246,534 B1 * 6/2001 Gillis et al. ................... 360/75
6,570,741 B2 5/2003 Yamanouchi ............ 360/254.4
RE38,390 E * 1/2004 Onooka et al. .......... 360/254.7
6,987,640 B2 * 1/2006 Tsang et al. ............. 360/97.02

FOREIGN PATENT DOCUMENTS

| JP | 6-84313 | 3/1994 |
|---|---|---|
| JP | 8-339650 | 12/1996 |
| JP | 2001-332048 | 11/2001 |

* cited by examiner

*Primary Examiner*—A. J. Heinz
(74) *Attorney, Agent, or Firm*—Kratz, Quintos & Hanson, LLP

(57) ABSTRACT

A recording medium drive such as a hard disk drive includes a ramp member. The ramp member receives the tip end of a head actuator. A head slider is thus kept at a position spaced from the recording medium even when the recording medium stands still. A rectifier plate is formed on the ramp member and opposed to the surface of the recording medium at a distance. The rectifier plate serves to sufficiently suppress turbulence of airflow generated along the surface of the rotating recording medium. The suppression of the turbulence in this manner leads to prevention of oscillation of the head slider. The head slider can thus be positioned right at a target point at a higher accuracy. The recording medium drive of the type is capable of greatly contributing to a higher recording density.

17 Claims, 5 Drawing Sheets

RECORDING MEDIUM DRIVE HAVING RECTIFIER PLATE INTEGRAL TO RAMP MEMBER

BACKGROUND OF THE INVENTION

1. Field of the Invention

The present invention relates to a recording medium drive such as a hard disk drive (HDD). In particular, the invention relates to a ramp member incorporated in a recording medium drive, said ramp member comprising: an attachment base located on the enclosure of the recording medium drive; and a ramp extending from the attachment base toward a recording medium and defining a slope approaching the surface of the recording medium at a position closer to the tip end of the slope.

2. Description of the Prior Art

A hard disk drive (HDD) sometimes comprises a ramp member. The ramp member is designed to maintain a head slider at a position spaced from the surface of a magnetic recording disk when the magnetic recording disk stands still. The ramp member serves to effectively prevent attachment between the head slider and a lubricant agent covering over the surface of the magnetic recording disk.

A still higher recording density is expected for an HDD. A track pitch may be reduced to obtain a higher recording density. Specifically, a space or distance may be narrowed between adjacent recording tracks. The reduction in the space or distance between the recording tracks requires positioning a read element and/or a write element on the head slider at a still higher accuracy. In particular, if the aforementioned ramp member can be utilized to improve the accuracy of positioning, assembling of the HDD is reliably prevented from getting complicated.

SUMMARY OF THE INVENTION

It is accordingly an object of the present invention to provide a recording medium drive capable of greatly contributing to a still higher recording density.

According to a first aspect of the present invention, there is provided a recording medium drive comprising: a recording medium; a head slider opposed to the surface of the recording medium at a distance; a head actuator supporting the head slider at the tip end thereof; a ramp member receiving the tip end of the head actuator and positioning the head slider at a position spaced from the recording medium; a rectifier plate formed on the ramp member and opposed to the surface of the recording medium at a distance.

When the recording medium is driven, airflow is generated along the surface of the recording medium. The rectifier plate serves to sufficiently suppress turbulence of the airflow. The suppression of the turbulence in this manner leads to prevention of oscillation of the head slider. The head slider can thus be positioned right at a target point at a higher accuracy. On the other hand, turbulence of the airflow tends to hinder an accurate positioning of the head slider. The recording medium drive of the invention is capable of greatly contributing to a still higher recording density. The rectifier plate may preferably be opposed to a data zone defined over the surface of the recording medium so as to suppress turbulence of the airflow.

In particular, the ramp member is utilized to locate the rectifier plate in the recording medium drive. The rectifier plate and the ramp member can be handled as one component. Assembling of the recording medium drive can be prevented to the utmost from getting complicated irrespective of addition of the rectifier plate. The recording medium drive can efficiently be manufactured.

A specific ramp member may be provided to realize the aforementioned recording medium drive. The ramp member may comprise: an attachment base located on the enclosure of a recording medium drive; a ramp extending to a recording medium from the attachment base and defining a slope designed to get closer to the surface of the recording medium at the tip end of the ramp member; a rectifier plate extending from at least either the attachment base or the ramp and opposed to the surface of the recording medium at a distance. The attachment base, the ramp and the rectifier plate may integrally be formed or molded from a resin material so as to realize the ramp member of the type. Otherwise, the rectifier plate may be made of a material different from that of the attachment base and the ramps. In this case, the rectifier plate maybe made of a resin material, a metal material, or the like. The rectifier plate may be embedded into the ramp member when the ramp member is molded. Any other method can be utilized to realize the ramp member.

The rectifier plate may be opposed to the surface of the recording medium at a patterned rectifier surface defined on the rectifier plate. In this case, the patterned rectifier surface may include a groove extending along the direction determined based on the relative movement between the recording medium and the rectifier plate. Alternatively, the patterned rectifier surface may include a protrusion extending along the direction determined based on the relative movement between the recording medium and the rectifier plate. Otherwise, the patterned rectifier surface may include a groove extending along a pair of inclined lines crossing a reference line set between the recording medium and the rectifier plate. The reference line may be determined based on the relative movement between the recording medium and the rectifier plate. The pattern may include a protrusion extending along the inclined lines, a step extending along the inclined lines, or the like. The grooves, protrusions and steps may be arranged along the reference line. In either case, the patterned rectifier surface serves to rectifier airflow in an enhanced efficient manner.

According to a second aspect of the present invention, there is provided a recording medium drive comprising: a recording medium; a head slider opposed to the surface of a recording medium; a head actuator supporting a head slider at the tip end and swinging about a support shaft: a rectifier plate opposed to the surface of the recording medium at a position outside an area between a path of movement of the head slider and the support shaft.

When the recording medium is driven, airflow is generated along the surface of the recording medium. The rectifier plate serves to sufficiently suppress turbulence of the airflow. The suppression of the turbulence in this manner leads to prevention of oscillation of the head slider. The head slider can thus be positioned right at a target point at a higher accuracy. On the other hand, turbulence of the airflow tends to hinder an accurate positioning of the head slider. The recording medium drive of the invention is capable of greatly contributing to a still higher recording density. The rectifier plate may preferably be opposed to a data zone defined over the surface of the recording medium so as to suppress turbulence of the airflow.

In particular, the rectifier plate can be located closer to the head slider without an interference of the head actuator. The head slider can be prevented from oscillation in an enhanced effective manner. The head slider can thus be positioned right at a target point at a still higher accuracy.

As described above, the rectifier plate may be opposed to the surface of the recording medium at a patterned rectifier surface defined on the rectifier plate. In this case, the patterned rectifier surface may Include a groove extending along the direction determined based on the relative movement between the recording medium and the rectifier plate. Alternatively, the patterned rectifier surface may include a protrusion extending along the direction determined based on the relative movement between the recording medium and the rectifier plate. Otherwise, the patterned rectifier surface may include a groove extending along a pair of inclined lines crossing a reference line set between the recording medium and the rectifier plate. The reference line may be determined based on the relative movement between the recording medium and the rectifier plate. The pattern may include a protrusion extending along the inclined lines, a step extending along the inclined lines, or the like. The grooves, protrusions and steps may be arranged along the reference line. In either case, the patterned rectifier surface serves to rectifier airflow in an enhanced efficient manner.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
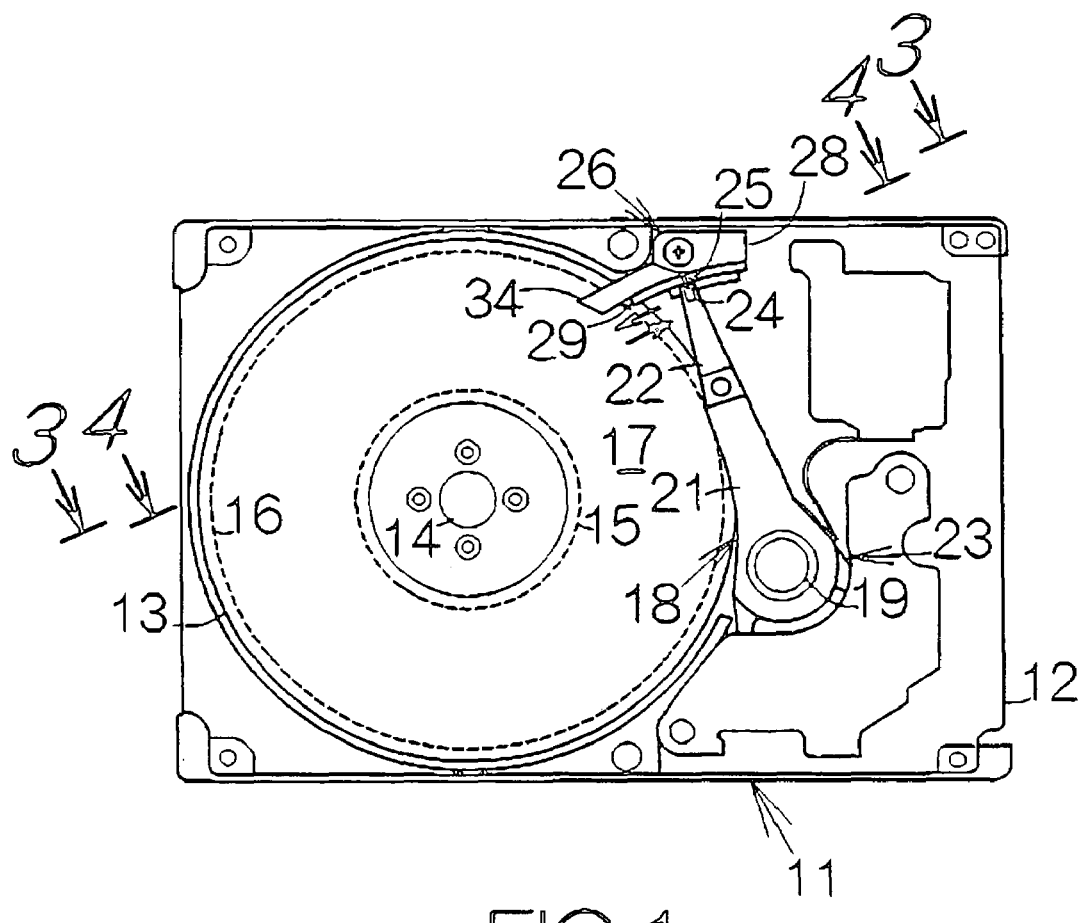
FIG. 1 is a plan view schematically illustrating the structure of a hard disk drive (HDD) according to an embodiment of the present invention.

FIG. 1 schematically illustrates the inner structure of a hard disk drive (HDD) 11 as an example of a recording medium drive or storage device according to an embodiment of the present invention. The HDD 11 includes a box-shaped main enclosure 12 defining an inner space of a flat parallelepiped, for example. At least one magnetic recording disk 13 is mounted on the driving shaft of a spindle motor 14 within the main enclosure 12. The spindle motor 14 is allowed to drive the magnetic recording disk 13 for rotation at a higher revolution speed such as 7,200 rpm or 10,000 rpm, for example. A cover, not shown, is coupled to the main enclosure 12 so as to define the closed inner space between the main enclosure 12 and the cover itself.

A data zone 17 is defined over the front and back surfaces of the magnetic recording disk 13 between an innermost recording track 15 and an outermost recording track 16. Concentric recording circles or tracks are defined within the data zone 17. No magnetic information is recorded on marginal zones inside the innermost recording track 15 and outside the outermost recording track 16.

A head actuator 18 is also accommodated in the inner space of the main enclosure 12 The head actuator 18 is coupled to a vertical support shaft 19 for relative rotation. The head actuator 18 comprises actuator arms 21 extending in the horizontal direction from the vertical support shaft 19, and elastic suspensions 22 respectively attached to the tip ends of the actuator arms 21 so as to extend in the forward direction from the actuator arms 21. The actuator arms 21 have a predetermined rigidity. The actuator arms 21 may be punched out of a stainless steel plate, for example. Alternatively, the actuator arms 21 may be formed by extrusion of an aluminum material. The actuator arms 21 are related to individual front and back surfaces of the magnetic recording disks 13.

As is apparent from FIG. 1, the actuator arm 21 is positioned at a predetermined inoperative or unload position when the magnetic recording disk 13 stands still. When the actuator arm 21 takes the inoperative position, the actuator arm 21 brings the tip end of the elastic suspension 22 outside the outer periphery of the magnetic recording disk 13. The actuator arm 21 is allowed to swing about the support shaft 19 from the inoperative position. When the actuator arm 21 swings about the support shaft 19, the tip end of the elastic suspension 22 moves in the radial direction of the magnetic recording disk 13 across the data zone 17 between the outermost recording track 16 and the innermost recording track 15. The actuator arm 21 defines a medium-opposed surface opposed to the magnetic recording disk 13 during the movement across the data zone 17. Any driving power source 23 such as a voice coil motor (VCM) may be utilized to realize the swinging movement of the actuator arm 21.

A flying head slider 24 is cantilevered at the front or tip end of the elastic suspension 22 with the assistance of a gimbal spring, not shown. The elastic suspension 22 serves to urge the flying head slider 24 toward the surface of the magnetic recording disk 13. When the magnetic recording disk 13 rotates, the flying head slider 24 is allowed to receive airflow generated along the rotating magnetic recording disk 13. The airflow serves to generate a lift on the flying head slider 24. The flying head slider 24 is thus allowed to keep flying above the surface of the magnetic recording disk 13 during rotation of the magnetic recording disk 13 at a higher stability established by the balance between the lift and the urging force of the elastic suspension 22. When the actuator arm 21 is driven to swing in the aforementioned manner during the flight of the flying head slider 24, the flying head slider 24 can be positioned right above a target recording track on the magnetic recording disk 13. When the actuator arm 21 is positioned at the inoperative position, the flying head slider 24 reaches a position outside the magnetic recording disk 13 beyond the outermost recording track 16.

A magnetic head or electromagnetic transducer, not shown, is mounted on the flying head slider 24. The electromagnetic transducer may include a write element such as a thin film head capable of writing magnetic information into the magnetic recording disk 13 based on the magnetic field induced at a thin film coil pattern, and a read element such as a giant magnetoresistive (GMR) element or a tunnel-junction magnetoresistive (TMR) element capable of reading magnetic information from the magnetic recording disk 13 based on the variation appearing in the electric resistance of the GMR or TMR film, for example.

A load bar 25 is attached to the front or tip end of the elastic suspension 22 so as to further extend in the forward direction from the elastic suspension 22. The load bar 25 is allowed to move in the radial direction of the magnetic recording disk 13 based on the swinging movement of the actuator arm 21. A ramp member 26 is located outside the magnetic recording disk 13 on the path of movement of the load bar 25. When the actuator arm 21 is positioned at the inoperative position, the load bar 25 is received on the ramp member 26. The combination of the load bar 25 and the ramp member 26 establishes a so-called load/unload mechanism as described later. The ramp member 26 may be made of a hard plastic material, for example.

Figure 2:
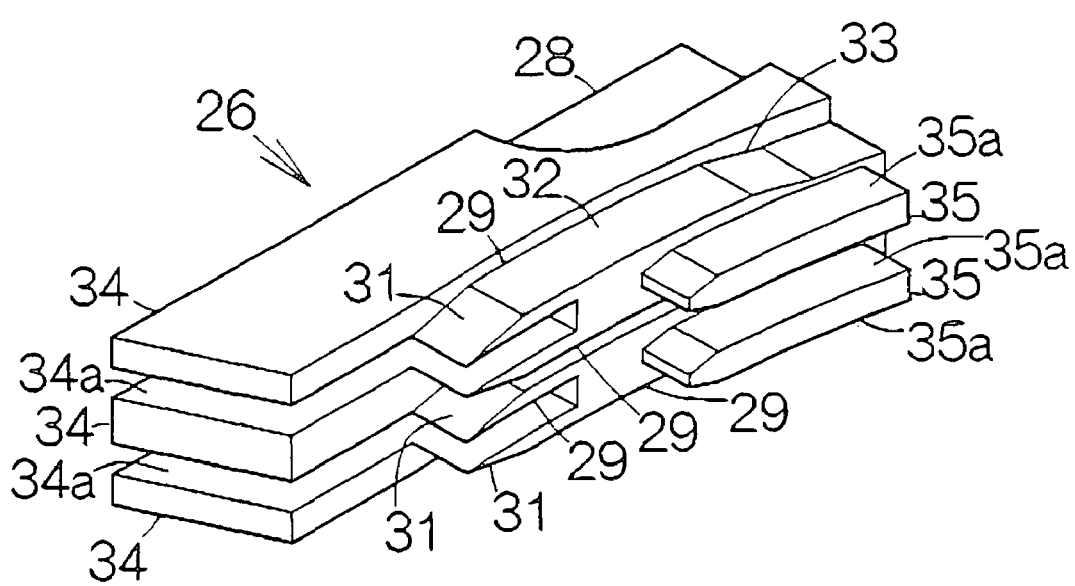
FIG. 2 is an enlarged perspective view of a ramp member.
Figure 3:
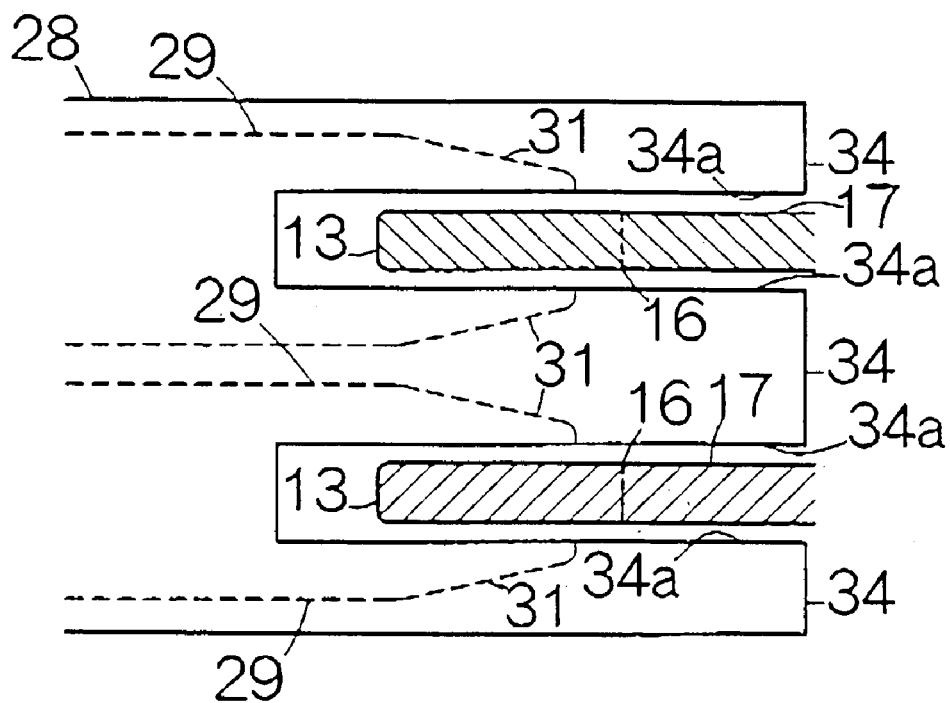
FIG. 3 is an enlarged partial sectional view of the HDD; taken along the line 3-3 in FIG. 1, for schematically illustrating the structure of a rectifier plate.

As shown in FIG. 2, the ramp member 26 includes an attachment base 28 screwed on the bottom plate of the main enclosure 12, and ramps 29 extending from the attachment base 28 in the horizontal direction toward the rotation axis of the magnetic recording disk 13. As is apparent from FIG. 3, the ramps 29 are opposed to the marginal zones outside the outermost recording track 16 on the magnetic recording disk 13. The front or tip ends of the ramps 29 are positioned in a space defined over the marginal zones. A pair of the ramps 29 are disposed between the adjacent magnetic recording disks 13.

A slope 31 is defined on the individual ramp 29 so as to extend outward from the tip end of the ramp 29 in the radial or centrifugal direction of the magnetic recording disk 13. The slope 31 is designed to get remote from the surface of the magnetic recording disk 13 at the radially outer location of the magnetic recording disk 13. A guiding passage 32 is connected to the outer end of the slope 31 so as to extend outward in the radial or centrifugal direction of the magnetic recording disk 13. A depression 33 is connected to the outer end of the guiding passage 32.

The ramp member 26 includes rectifier plates 34 extending from the attachment base 28 in the horizontal direction toward the rotation axis of the magnetic recording disk 13. As is apparent from FIG. 3, the tip ends of the rectifier plates 34 reach positions closer to the rotation axis of the magnetic recording disk 13 as compared with the tip ends of the ramps 29. A rectifier surface or surfaces 34a is defined on the rectifier plate 34 so as to extend in parallel with the surface of the magnetic recording disk 13. The rectifier surface 34a is opposed to the data zone 17 on the magnetic recording disk 13. The rectifier surface 34a will be described later in detail. The sole rectifier plate 34 may be disposed for a pair of the ramps 29 between the adjacent magnetic recording disks 13. This type of the rectifier plate 34 may be opposed to the surface of the adjacent magnetic disks 13 at the rectifier surfaces 34a, 34a defined over the front and back surfaces of the rectifier plate 34. The rectifier plate 34 may be continuous to the ramp 29 and/or to the attachment base 28. The rectifier plate 34 is allowed to have a width larger than that of the ramp 29 and the slope 31 in the circumferential direction of the magnetic recording disk 13.

As shown in FIG. 2, receiving members 35 are defined on the ramp member 26 adjacent the ramps 29. Receiving surfaces 35a are defined on the receiving member 35 so as to extend side by side with the guiding passage 32 and the depression 33. The receiving surfaces 35a may be defined on the front and back surfaces of the receiving member 35.

Figure 4:
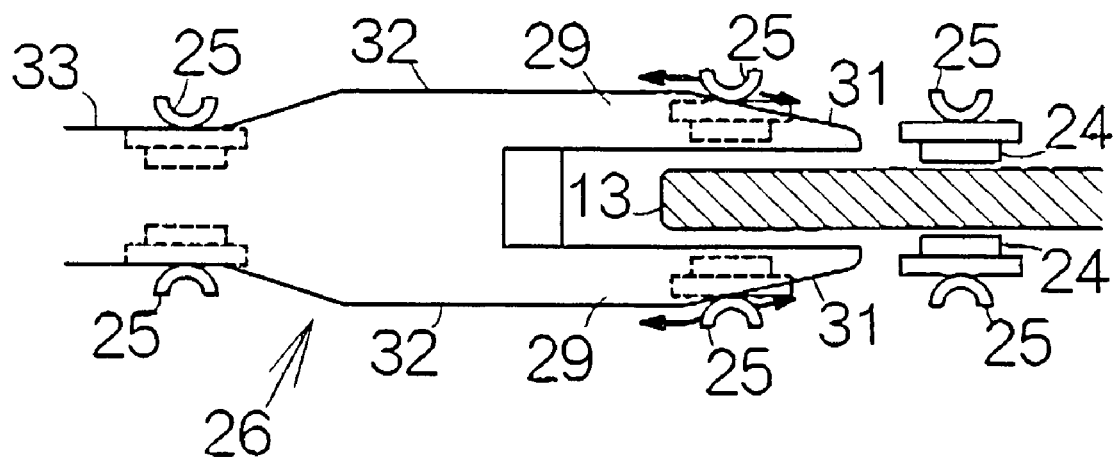
FIG. 4 is an enlarged partial sectional view of the HDD, taken along the line 4-4 in FIG. 1, for schematically illustrating the structure and function of the ramp member.

Now, assume that the magnetic recording disk 13 stops rotating. When read/write operation has been completed, the driving power source 23 drives the actuator arm 21 in a normal direction toward the inoperative position. As shown in FIG. 4, when the flying head slider 24 gets opposed to the marginal or landing zone outside the outermost recording track 16, the load bar 25 is allowed to contact the slope 31 of the ramp 29. A further swinging movement of the actuator arm 21 allows the load bar 25 to climb up the slope 31. As the load bar 25 climbs the slope 31, the flying head slider 24 gets remote from the surface of the magnetic recording disk 13. The load bar 25 is in this manner received on the ramp member 26. When the actuator arm 21 has reached the inoperative position, the load bar 25 is received in the depression 33. The magnetic recording disk 13 stops rotating. Since the load bar 25 is reliably held on the ramp member 26, the flying head slider 24 is prevented from colliding or contacting against the magnetic recording disk 13 even without any airflow acting on the flying head slider 24. The flying head slider is thus effectively prevented from any attachment to a lubricant agent covering over the surface of the magnetic recording disk 13.

When the HDD 11 receives instructions to read or write magnetic information, the magnetic recording disk 13 starts to rotate. The driving power source 23 drives the actuator arm 21 in the reverse direction opposite to the aforementioned normal direction after the rotation of the magnetic recording disk 13 has entered the steady condition. The load bar 25 is allowed to move out of the depression 33 toward the slope 31. A further swinging movement of the actuator arm 21 causes the load bar 25 to move down the slope 31.

During the downward movement of the load bar 25, the flying head slider 24 gets opposed to the surface of the magnetic recording disk 13. Airflow generated along the surface of the magnetic recording disk 13 induces a lift on the flying head slider 24. A further swinging movement of the actuator arm 21 allows the load bar 25 to take off from the slope 31 or ramp member 26. Since the magnetic recording disk 13 rotates in the steady condition, the flying head slider 24 is allowed to fly above the surface of the magnetic recording disk 13 without a support from the ramp member 26.

The airflow is generated during the rotation of the magnetic recording disk 13 in the HDD 11. The rectifier plates 34 serve to suppress turbulence of the airflow. The suppression of the turbulence results in the prevention of oscillation of the flying head slider 24. The flying head slider 24 can be positioned right above a target recording track on the magnetic recording disk 13 at a higher accuracy. On the other hand, if turbulence is induced in the airflow, the flying head slider 24 maybe hindered from being accurately positioned. Moreover, the rectified airflow due to the rectifier plate 34 serves to suppress a deformation or oscillation of the rotating magnetic recording disk 13. The flying head slider 24 can thus be positioned at a still higher accuracy. The HDD 11 of this type greatly contributes to an improved recording density.

In particular, the ramp member 26 is utilized to locate the rectifier plate 34 in the aforementioned HDD 11. The rectifier plate 34 and the ramp member 26 can be handled as one component. Assembling of the HDD 11 can be prevented to the utmost from getting complicated irrespective of addition of the rectifier plate 34. The HDD 11 can efficiently be manufactured. The attachment base 28 the ramps 29 and the rectifier plates 34 may integrally be formed or molded from a resin material, for example. Otherwise, the rectifier plates 34 may be made of a material different from that of the attachment base 28 and the ramps 29. In this case, the rectifier plates 34 may be made of a resin material, a metal material, or the like. The rectifier plate 34 may be embedded into the ramp member 26 when the ramp member 26 is molded, for example.

Figure 5:
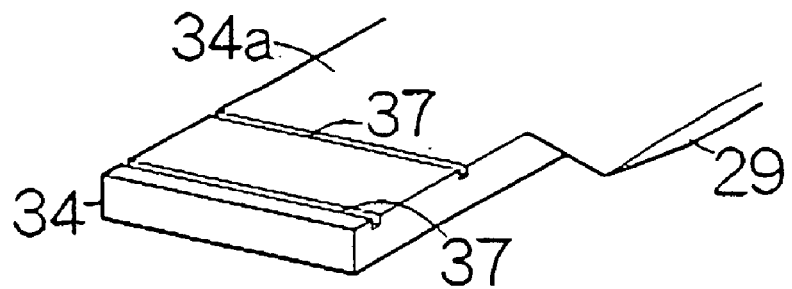
FIG. 5 is an enlarged perspective view of the rectifier plate for schematically illustrating a patterned rectifier surface according to a specific example.
Figure 6:
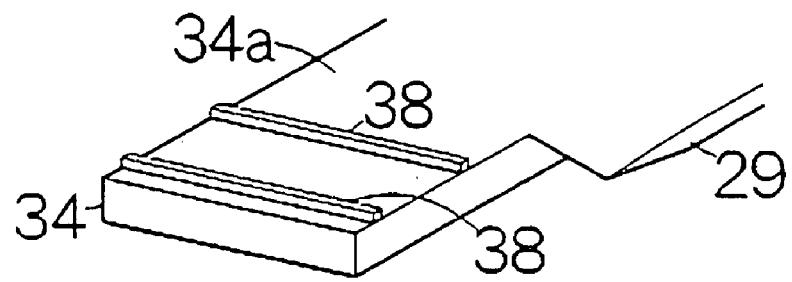
FIG. 6 is an enlarged perspective view of the rectifier plate for schematically illustrating a patterned rectifier surface according to another specific example.

A predetermined pattern maybe established on the rectifier surface 34a in the aforementioned rectifier plate 34. As shown in FIG. 5, the pattern may include grooves 37 extending along the direction determined based on the relative movement between the magnetic recording disk 13 and the rectifier plate 34, namely, along the circumferential direction of the magnetic recording disk 13. The rectifier surface 34a of this type serves to effectively rectify the airflow over the surface of the magnetic recording disk 13. Alternatively, the pattern may include protrusions 38 extending along the aforementioned direction or circumferential direction, as shown in FIG. 6, for example.

Figure 7:
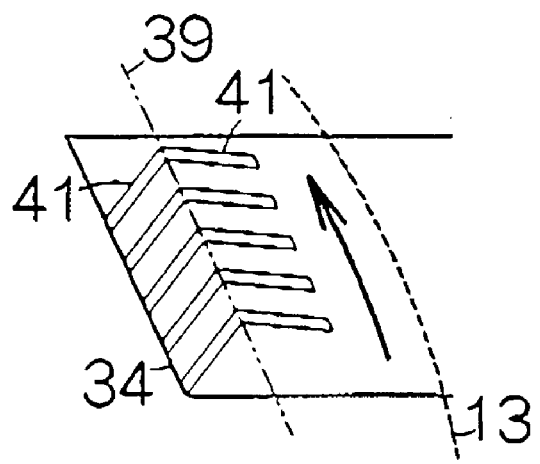
FIG. 7 is an enlarged perspective view of the rectifier plate for schematically illustrating a patterned rectifier surface according to still another specific example.
Figure 8:
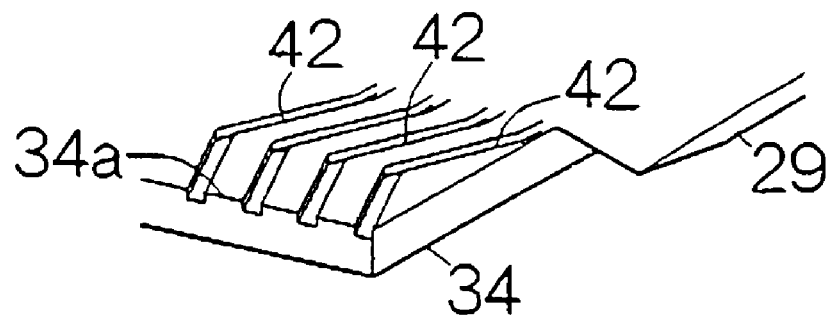
FIG. 8 is an enlarged perspective view of the rectifier plate for schematically illustrating a pattern defined on the rectifier surface based on pairs of inclined lines according to a specific example.
Figure 9:
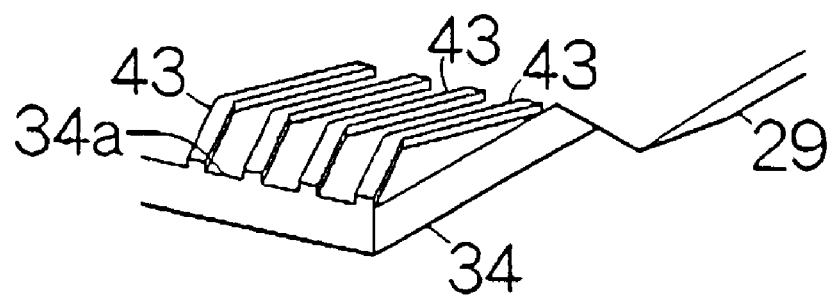
FIG. 9 is an enlarged perspective view of the rectifier plate for schematically illustrating a pattern defined on the rectifier surface based on pairs of inclined lines according to another specific example.
Figure 10:
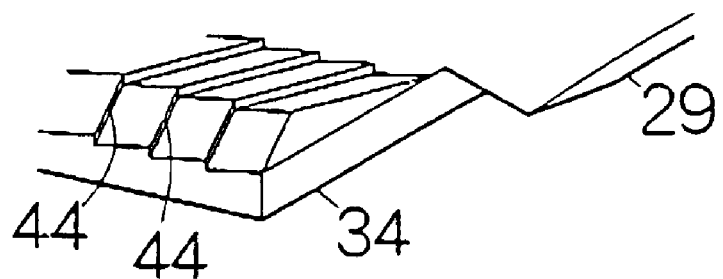
FIG. 10 is an enlarged perspective view of the rectifier plate for schematically illustrating a pattern defined on the rectifier surface based on pairs of inclined lines according to still another specific example.

In place of the grooves 37 and protrusions 38, the pattern may be defined based on pairs of inclined lines 41, 41 intersecting a straight reference line 39 at the identical point, as shown in FIG. 7, for example. The reference line 39 is determined based on the relative movement between the magnetic recording disk 13 and the rectifier plate 34. In this case, the pattern may include grooves 42 extending along pairs of inclined lines 41, 41, as shown in FIG. 8, for example. Alternatively, the pattern may include protrusions 43 in place of the grooves 42, as shown in FIG. 9, for example. Otherwise, the pattern may include steps 44 extending along pairs of inclined lines 41, 41, as shown in FIG. 10, for example.

The inventors have verified the effect of the aforementioned rectifier plate 34. The inventors prepared seven HDDs 11 of the 2.5 inches type. Two magnetic recording disks 13 were incorporated in the individual HDD 11. The flying head sliders 24 were opposed to the front and back surfaces of the individual magnetic recording disks 13. A shift of the flying head slider 24 was measured in the radial direction of the rotating magnetic recording disk 13. The flying head slider 24 was positioned above the outermost recording track 16, the innermost recording track 15, and the middle between the outermost recording track 16 and the innermost recording track 15 in the radial direction. The revolution speed of the magnetic recording disk 13 was set at 5,400 rpm. The measurement was effected in the environment of 65 degrees Celsius. The average of the shifts was calculated for seven HDDs 11.

Three kinds of the ramp member were prepared for the individual HDDs 11. The rectifier plate 34 was set to extend from the periphery of the magnetic recording disk 13 toward the rotation axis thereof by the length of 4.0 mm in a first example of the present invention. The rectifier plate 34 according to a second example of the present invention was set to extend from the periphery of the magnetic recording disk 13 toward the rotation axis thereof. In both examples, the space of 0.4 mm was set between the rectifier surface 34a of the rectifier plate 34 and the magnetic recording disk 13. No pattern was established on the rectifier surface 34a. The inventors also prepared a comparative example. No rectifier plate 34 was formed in the comparative example in a conventional manner.

Figure 11:
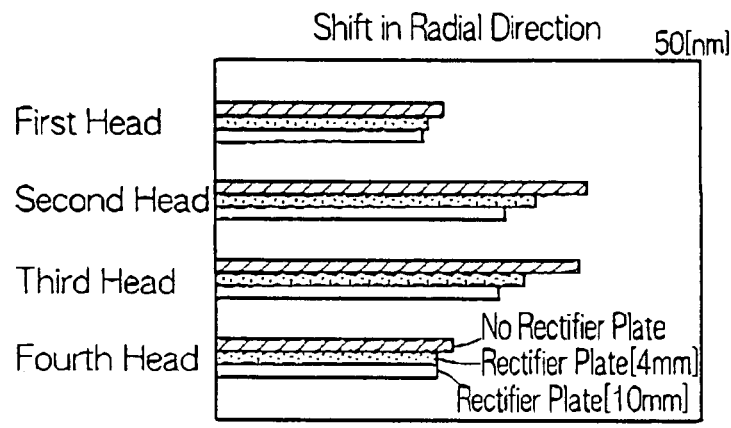
FIG. 11 is a graph showing average amounts of shift of flying head sliders positioned at outermost areas of magnetic recording disks.

As shown in FIG. 11, it has been proved that the rectifier plate 34 serves to suppress the shift of the flying head slider 24 at an area near the periphery of the magnetic recording disk 13. In particular, the rectifier plate 34 has greatly improved the accuracy of position of the flying head slider 24 for the second and third heads disposed between the magnetic recording disks 13. The numbering such as "first" to "fourth" head was effected from the flying head slider 24 nearest to the bottom plate of the main enclosure 12 to the flying head slider 24 nearest to the cover.

Figure 12:
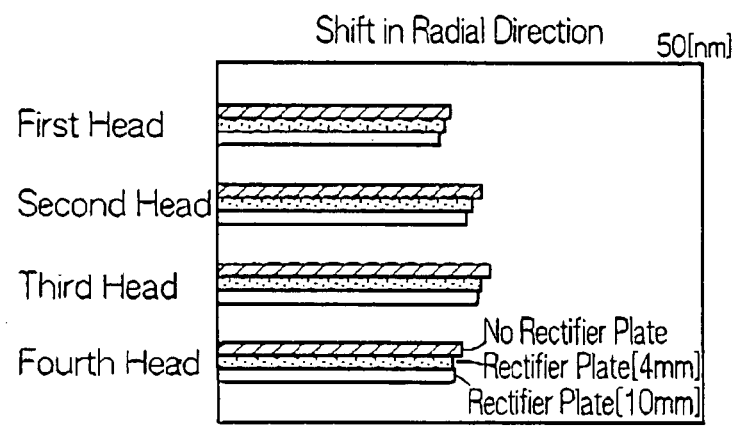
FIG. 12 is a graph showing average amounts of shift of flying head sliders positioned at middles of the radius on the magnetic recording disks.
Figure 13:
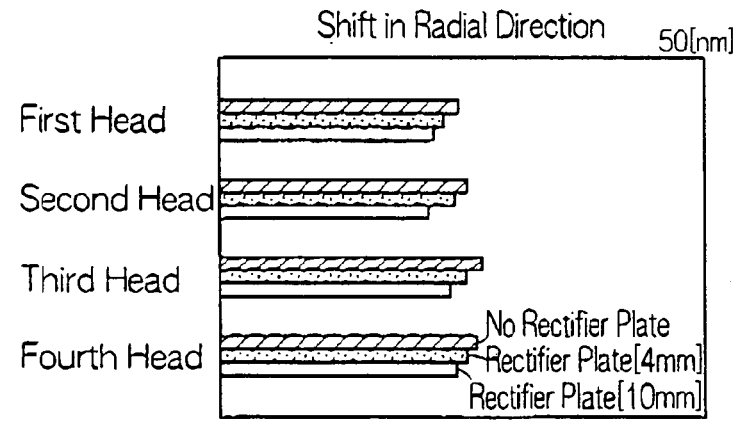
FIG. 13 is a graph showing average amounts of shift of flying head sliders positioned at innermost areas of the magnetic recording disks.

FIG. 12 shows the amount of shift measured in the radial direction of the magnetic recording disk 13 for the flying head sliders 24 positioned at the middle of the radius of the magnetic recording disk 13. FIG. 13 shows the amount of shift measured in the radial direction of the magnetic recording disk 13 for the flying head sliders 24 positioned at the innermost recording track 15. As is apparent from FIGS. 12 and 13, even though the rectifier plate 34 was opposed to the peripheral area of the magnetic recording disk 13, the shift of the flying head sliders 24 was suppressed at the middle of the radius and at the innermost area of the magnetic recording disk 13. The rectifier plates 34 are surely supposed to suppress deformation of the magnetic recording disks 13, so that the flying head sliders 24 are allowed to enjoy the improvement in positional accuracy at the middle of the radius and the innermost area of the magnetic recording disk 13.

What is claimed is:

1. A recording medium drive comprising:
    a recording medium defining a first surface and a second surface reverse to the first surface;
    a first head slider opposed to the first surface of the recording medium at a distance;
    a second head slider opposed to the second surface of the recording medium at a distance;
    a head actuator supporting the first and second head sliders at tip ends of the head actuator, respectively;
    a ramp member fixed at a position outside an outer periphery of the recording medium, said ramp member including first and second ramps, the first ramp being designed to receive one of the tip ends of the head actuator so as to position the first head slider at a position spaced from the recording medium, the second ramp being designed to receive another of the tip ends of the head actuator so as to position the second head slider at a position spaced from the recording medium;
    a first rectifier plate formed on the ramp member and opposed to the first surface of the recording medium at a distance; and
    a second rectifier plate formed on the ramp member and opposed to the second surface of the recording medium at a distance,
    wherein the ramp member and the first and second rectifier plates are made into one piece.

2. The recording medium drive according to claim 1, wherein at least one of the first and second rectifier plates face a data zone defined over the first and second surfaces of the recording medium.

3. The recording medium drive according to claim 1, wherein said ramp member is a molded product including said first and second rectifier plates.

4. The recording medium drive according to claim 3, wherein said first and second rectifier plates are a molded product integral to the ramp member.

5. The recording medium drive according to claim 3, wherein said first and second rectifier plates are made of a metal material embedded in the ramp member.

6. A ramp member comprising:
- an attachment base located on an enclosure of a recording medium drive at a position outside an outer periphery of a recording medium;
- a ramp extending toward the recording medium from the attachment base and defining a slope designed to approach a surface of the recording medium at a tip end; and
- a rectifier plate opposed to the surface of the recording medium, the rectifier plate defining a patterned rectifier surface opposed to the surface of the recording medium at a distance.

7. The ramp member according to claim 6, wherein the patterned rectifier surface includes a groove extending along a direction determined based on a relative movement between the recording medium and the rectifier plate.

8. The ramp member according to claim 6, wherein the patterned rectifier surface includes a protrusion extending along a direction determined based on a relative movement between the recording medium and the rectifier plate.

9. The ramp member according to claim 6, wherein the patterned rectifier surface includes a groove extending along a pair of inclined lines crossing a reference line determined based on a relative movement between the recording medium and the rectifier plate.

10. The ramp member according to claim 6, wherein the patterned rectifier surface includes a protrusion extending along a pair of inclined lines crossing a reference line determined based on a relative movement between the recording medium and the rectifier plate.

11. The ramp member according to claim 6, wherein the patterned rectifier surface includes a step extending along a pair of inclined lines crossing a reference line determined based on a relative movement between the recording medium and the rectifier plate.

12. A recording medium drive comprising:
- a recording medium;
- a head slider opposed to a surface of the recording medium at a distance;
- a head actuator supporting the head slider at a tip end of the head actuator;
- a ramp member designed to receive the tip end of the head actuator so as to position the head slider at a position spaced from the recording medium; and
- a rectifier plate formed on the ramp member, the rectifier plate defining a patterned rectifier surface opposed to a surface of the recording medium at a distance.

13. A ramp member comprising:
- an attachment base located on an enclosure of a recording medium drive at a position outside an outer periphery of a recording medium, the recording medium defining a first surface and a second surface reverse to the first surface;
- a first ramp extending toward the recording medium from the attachment base and defining a slope designed to approach the first surface of the recording medium at a tip end;
- a second ramp extending toward the recording medium from the attachment base and defining a slope designed to approach the second surface of the recording medium at a tip end;
- a first rectifier plate opposed to the first surface of the recording medium at a distance; and
- a second rectifier plate opposed to the second surface of the recording medium at a distance,
- wherein the attachment base, first and second ramps and the first and second rectifier plates are made into one piece.

14. The ramp member according to claim 13, wherein at least one of the first and second rectifier plates face a data zone defined over the first and second surfaces of the recording medium.

15. The ramp member according to claim 13, wherein said attachment base and ramp are a molded product including said first and second rectifier plates.

16. The ramp member according to claim 15, wherein said first and second rectifier plates are a molded product integral to the attachment base and ramp.

17. The ramp member according to claim 15, wherein said first and second rectifier plates are made of a metal material embedded in the attachment base and ramp.

* * * * *